(12) United States Patent
Scott

(10) Patent No.: US 6,547,935 B2
(45) Date of Patent: Apr. 15, 2003

(54) METHOD AND APPARATUS FOR TREATING FLUIDS

(76) Inventor: Harold W. Scott, 13220 Hillcrest Dr., Dallas, TX (US) 75240-5407

(*) Notice: Subject to any disclaimer, the term of this patent is extended or adjusted under 35 U.S.C. 154(b) by 3 days.

(21) Appl. No.: 09/755,915

(22) Filed: Jan. 6, 2001

(65) Prior Publication Data

US 2002/0088705 A1 Jul. 11, 2002

(51) Int. Cl.[7] .............................. C07C 1/00; C02F 1/48
(52) U.S. Cl. .............................. 204/157.15; 204/158.2; 210/748
(58) Field of Search .......................... 204/158.2, 157.15; 210/748

(56) References Cited

U.S. PATENT DOCUMENTS

| 3,672,823 A | 6/1972 | Boucher ................. 21/54 R |
| 4,074,758 A | 2/1978 | Scott ..................... 166/249 |
| 4,164,978 A | 8/1979 | Scott ..................... 166/249 |
| 4,169,503 A | 10/1979 | Scott ................... 166/65 R |
| 4,365,518 A | * 12/1982 | Zacharias, Jr. ........ 73/861.31 |
| 4,369,100 A | * 1/1983 | Sawyer ............... 204/157.1 S |
| 5,164,094 A | * 11/1992 | Stuckart ................. 210/708 |
| 5,951,456 A | 9/1999 | Scott ...................... 516/195 |

FOREIGN PATENT DOCUMENTS

| WO | WO 99/27972 | 6/1999 |
| WO | WO 00/55097 | 9/2000 |
| WO | WO 00/58224 | 10/2000 |

OTHER PUBLICATIONS

The Chemical Effects of Ultrasound by Kenneth S. Suslick, *Scientific American*, vol. 260, No. 2, Feb. 1989.
The Development and Evaluation of Ultrasound in the Biocidal Treatment of Water, S.S. Phull, A.P. Newman, J.P. Lorimer, B. Pollet and T.J. Mason, Ultrasonics: Sonochemistry, Butterworth–Heinemann, GB, vol. 4, No. 2, Apr. 1, 1977.

* cited by examiner

*Primary Examiner*—Edna Wong
(74) *Attorney, Agent, or Firm*—F. Lindsey Scott

(57) ABSTRACT

A method and apparatus for treating fluids by transmitting ultrasonic energy into the fluids to produce high intensity cavitations in the fluids as the fluids pass through the apparatus. The fluids are retained in the apparatus for a sufficient period of time to destroy contaminates in the fluids, neutralize acids or bases in the fluids and dissociate other chemical compounds.

9 Claims, 1 Drawing Sheet

US 6,547,935 B2

METHOD AND APPARATUS FOR TREATING FLUIDS

FIELD OF THE INVENTION

This invention relates to a method and apparatus for treating fluids and particularly for treating water to destroy contaminates in the water and sterilize the water. The apparatus and method are effective to treat the water using ultrasonic energy to dissociate compounds in the water.

BACKGROUND OF THE INVENTION

The use of ultrasound to treat various materials is well known to those skilled in the art. The general principles relating to the use of ultrasonic energy to treat various materials and its ability to result in dissociation of materials and to perform other difficult chemical reactions and the like is discussed in "The Chemical Effects of Ultrasound", Kenneth S. Suslick, Scientific American, February 1989, pages 80–86.

Ultrasound has been used for a number of applications and ultrasonic transducers are well known to those skilled in the art and are commercially available. Some applications of ultrasonic techniques are shown in U.S. Pat. No. 4,164,978 issued Aug. 21, 1979 to Harold W. Scott; U.S. Pat. No. 4,169,503 issued Oct. 2, 1979 to Harold W. Scott; and U.S. Pat. No. 5,951,456 issued Sep. 14, 1999 to Harold W. Scott. These patents are hereby incorporated in their entirety by reference.

The availability of pure fluids is an ongoing problem in our society. In many instances it is desirable to be able to purify various gases which may contain bacterial or viral contaminates or various gaseous compound contaminates. The purification of gases, while it is frequently required, is less frequently required than the purification of liquids. Liquids, such as water, are widely used for a variety of purposes. Techniques for purifying water range from ionization techniques, to distillation and the wide variety of techniques used in municipal and other water treating plants to produce potable water. All of these techniques are relatively expensive and require extensive process equipment and process activity and expense to purify the water. Accordingly, improved and more efficient methods have long been sought for purifying fluids and particularly for purifying liquids such as water.

SUMMARY OF THE INVENTION

According to the present invention an apparatus for treating fluids is provided. The apparatus comprises a radial ultrasonic transducer having an inner surface, a central passageway having a central axis, a tube having an outer surface and centrally positioned at least partially through the central passageway, a fluid inlet to the passageway, and a fluid outlet from the passageway.

The present invention further comprises a method for treating a fluid wherein the method comprises passing the fluid through a passageway through a radial transducer, the passageway being formed between an inside surface of the radial transducer and the outside of a tube centrally and axially positioned at least partially through the passageway.

DESCRIPTION OF PREFERRED EMBODIMENTS

In the discussion of the Figures the same numbers will be used throughout to refer to the same or simalar components.

Figure 1:
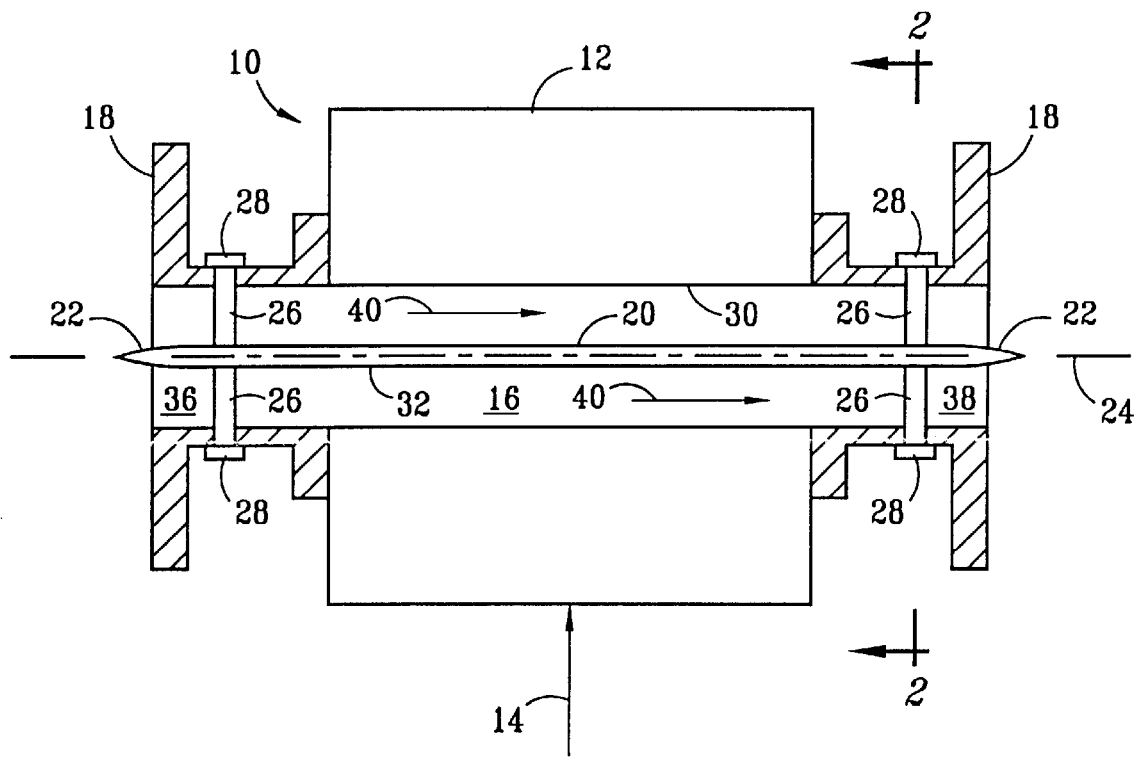
FIG. 1 is a schematic diagram of an apparatus for treating fluid according to the present invention.

In FIG. 1 an apparatus 10 according to the present invention is shown. The apparatus comprises a radial transducer 12 which is connected to a power supply 14 and encloses a passageway 16 axially positioned through the radial transducer. The passageway and transducer are symmetrically positioned around an axis 24. Radial transducer 12 is positioned for flow through passageway 16 by a pair of flanges 18 as shown. These flanges may be of any suitable construction and may be joined to transducer 12 by any suitable means. The transducer is joined to flanges 18 sealingly for the flow of fluids through a passage inlet 36 to a passage outlet 38 as shown by arrows 40.

Transducer 12 can be of any suitable configuration for providing ultrasonic power into passageway 16. For instance, prefabricated radial transducers are available at a variety of frequencies. These transducers are considered to be well known to those skilled in the art and any suitable configuration may be used so long as ultrasonic power is provided to passageway 16. Passageway 16 is sized so that the ultrasonic energy transmitted into passageway 16 is of a wavelength equal to the diameter of passageway 16. A variety of transducer frequencies may be used. Such frequencies may vary from about 10 to about 400 kilohertz with frequencies from 20 to about 200 kilohertz being preferred.

Figure 2:
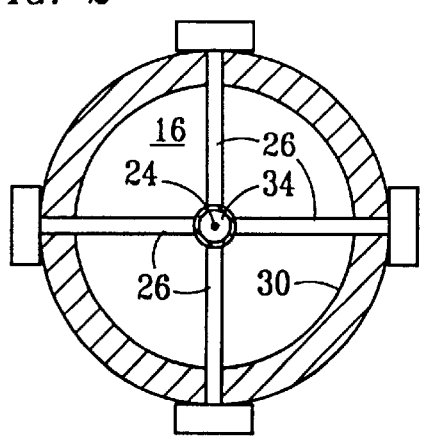
FIG. 2 is an end view of a fluid passageway through the apparatus of FIG. 1.

As shown in FIG. 1 a tube 20 is positioned coaxially in radial transducer 12 and extending at least partially through passageway 16. The ends 22 of tube 20 are desirably closed by any suitable configuration and preferably with a curved elliptical or otherwise rounded configuration to minimize the restriction of flow created by tube 20. Tube 20, while it may be open-ended with a gas flow through the tube or otherwise positioned in the tube, is desirably closed. The closed tube is filled with any suitable gas which will not transmit ultrasonic energy inside tube 20, tube 20 is desirably supported coaxially relative to transducer 12 in passageway 16. A plurality of supports 26 are shown supporting tube 20 in position. Adjustable fasteners 28 are positioned to sealingly engage flanges 18 to permit adjustment of tube 20 and retention of tube 20 in passageway 16. While four support tubes have been shown in FIG. 2 it will be understood that more or fewer supports could be used. It is however, desirable that the supports be sufficient to maintain tube 20 centrally positioned in passageway 16. Preferably at least three supports are used.

As shown in FIG. 1 fluid flows into passageway 16 via inlet 36 and out via outlet 38 as shown by arrows 40.

In operation ultrasonic energy is introduced into the fluid in passageway 16 from an inner surface 30 of passageway 16. The ultrasonic energy, as well known to those skilled in the art, is transmitted in waveform and passes inwardly to the inner surface of tube 20. Since tube 20 is filled with a non-transmitting fluid the wave the ultrasonic energy is reflected back resulting in intense energy with cavitation and the like in the space defined by inside 30 of passageway 16 and an outside 32 of tube 20. Desirably, axis 24 is positioned at ½ of 1 wavelength at the frequency of transducer 12 from inside 30 of passageway 16. The distance between the inside 30 of passageway 16 and the outside of tube 20 is a distance which is not a multiple, i.e. multiple or fraction, of the ultrasonic wavelength at the chosen frequency and will not permit a standing wave in passageway 16. The diameter of tube 20 is sufficient to result in a space less than ½ wavelength between inside 30 of passageway 16 and outside 32 of tube 20. This results in intense cavitation normal to the fluid flow in passageway 16. It is important that the distance between the inside of passageway 16 and the outside of tube 20 be less than a multiple of the wavelength produced by transducer 12 which will result in a standing wave. Energy transmitted into passageway 16 is sufficient to result in severe intense cavitation in the fluid flow with the intensity increasing toward the center of the radial transducer. The sealed tube reflects the waves to the originating surface thus increasing the intensity between the outside 32 of tube 20 and inside 30. The intensity between inside 30 of passageway 16 and outside 32 of tube 20 is many times the intensity radiating from the source.

This high intensity creates destructive forces that destroy bacteria or viruses by instant high temperatures of thousands of degrees Celsius and pressures of hundreds to thousands of atmospheres at heating times less than a microsecond. While Applicant does not wish to be bound by any theory it appears that in addition OH and $H_2O_2$ radicals are formed which destroy bacteria and shock waves are also generated which destroy cellular structures and bacteria. Bacteria and viruses are organic compounds and are destroyed in such an environment. Further, non-elemental materials such as nitrates and other undesirable contaminates are also destroyed. For instance, nitrates may be converted into water, nitrogen and oxygen by treatment in the apparatus. Residence times in the apparatus are desirably at least about 50 milliseconds.

Desirably, the energy transmitted into passageway 16 at surface 30 is from about 1.6 to about 1.8 watts per square centimeter. Typically, under such conditions the energy level at outer surface 32 of inner tube 20 is about 9.5 to about 10.0 watts per square centimeter. Desirably, the average energy level in passageway 16 is greater than about 1.5 watts per square centimeter. Under these conditions substantially all non-elemental compounds in the flowing stream are dissociated.

The fluids treatable in the method of the present invention comprise any gas or liquid from which it is desired to remove contaminates. Water is a frequently treated liquid and is readily treated by the method of the present invention.

The fluids are treated by the method of the present invention by passing the fluids through the passageway and passing the ultrasonic energy into the fluid at the levels discussed above. Desirably, the fluids are retained in the passageway for a time equal to at least about 50 milliseconds. Example: A radial transducer having an inner diameter of 3.0625 inches and a length of 6 inches is used with a tube having an outer diameter of 0.500 inches and a length of 6 inches. The radial transducer radiates approximately 600 watts from its inner surface. At this power level 1.611 watts per square centimeter of power is delivered to the passageway 16. A liquid flow rate of 72 hundred gallons per hour through the apparatus was used. At this flow rate the residence time of the fluid in the apparatus is about 93 milliseconds. This treatment system is effective to destroy all bacteria or viruses contained in the flowing fluid.

Having thus described the invention by reference to certain of its' preferred embodiments it is pointed out that the embodiments described are illustrative rather than limiting in nature and that many variations and modification are possible within the scope of the present invention.

I claim:

1. A method for treating a fluid, the method comprising:
    a) passing the fluid through a passageway through a radial transducer, the passageway being formed between an inside surface of the radial transducer and the outside of a tube filled with a gas which will not transmit ultrasonic energy and centrally and axially positioned at least partially through the radial transducer at a distance between the inside of the radial transducer and the outside of the tube which will not result in a standing wave in the passageway;
    b) passing ultrasonic wave power into the fluid at a level equal to from about 1.6 to about 1.8 watts/square cm at the inside surface of the passageway so that intense cavitation normal to the fluid flow through the passageway is present; and
    c) retaining the fluid in the passageway for a time equal to at least about 50 milliseconds.

2. The method of claim 1 wherein the radial transducer supplies ultrasonic energy at a frequency from about 10 to about 400 kilohertz.

3. The method of claim 2 wherein the frequency is from about 20 to about 200 kilohertz.

4. The method of claim 1 wherein the average energy level in the passageway is greater than about 15 watts/cm$^2$.

5. The method of claim 1 wherein the fluid is a liquid.

6. The method of claim 5 wherein the liquid comprises water.

7. The method of claim 6 wherein substantially all bacteria and viruses in the water are destroyed.

8. The method of claim 6 wherein nitrate compounds in the water are destroyed.

9. The method of claim 6 wherein substantially all non-elemental compounds in the water are dissociated.

* * * * *